Jan. 28, 1969    R. E. DAWSON    3,425,056
WARNING LENS HAVING CONCENTRIC LENTICULAR ELEMENTS
Filed Nov. 27, 1964    Sheet 1 of 3

INVENTOR.
ROBERT E. DAWSON
BY Bruns and Jenney
Attys

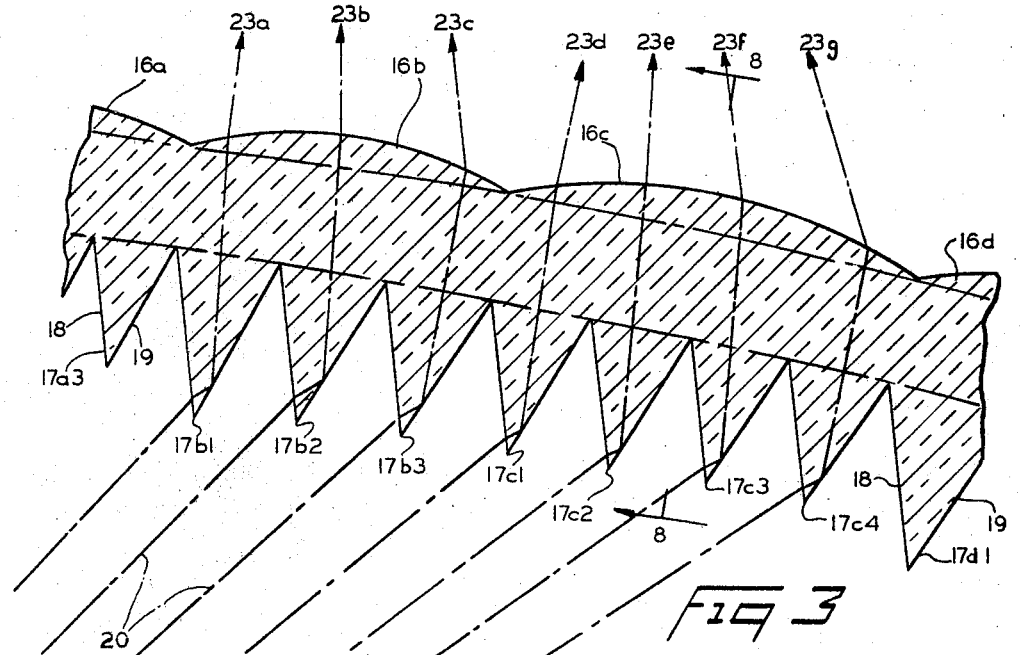
Fig. 3
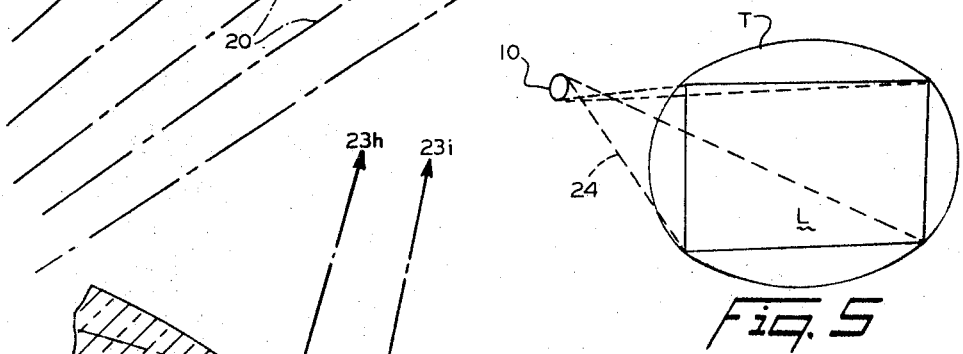
Fig. 5
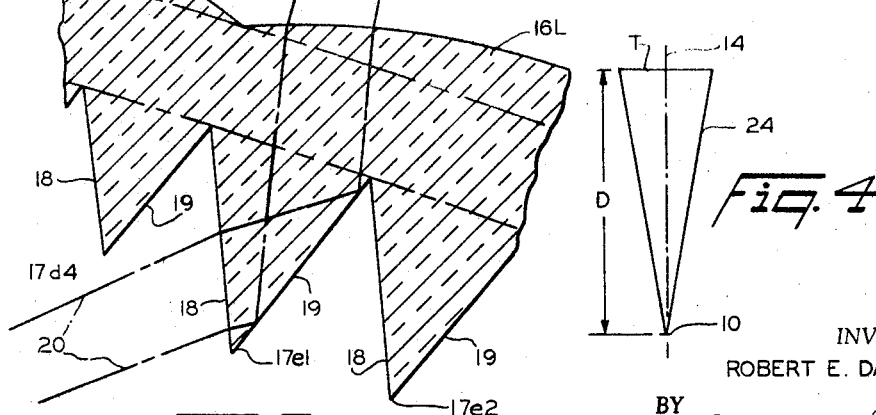
Fig. 6
Fig. 4
INVENTOR.
ROBERT E. DAWSON
BY Bruns and Jenney
Att'ys Jan. 28, 1969  R. E. DAWSON  3,425,056
WARNING LENS HAVING CONCENTRIC LENTICULAR ELEMENTS
Filed Nov. 27, 1964  Sheet 3 of 3

INVENTOR.
ROBERT E. DAWSON
BY Bruno and Jenney
Att'ys

United States Patent Office 3,425,056
Patented Jan. 28, 1969

3,425,056
WARNING LENS HAVING CONCENTRIC LENTICULAR ELEMENTS
Robert E. Dawson, Huntingdon Valley, Pa., assignor to R. E. Dietz Company, Syracuse, N.Y.
Filed Nov. 27, 1964, Ser. No. 414,103
U.S. Cl. 340—383                           6 Claims
Int. Cl. G09f 13/04

ABSTRACT OF THE DISCLOSURE

A dished warning lens having spherically surfaced lenticular elements projecting from the arcuate front base surface and V-shaped catadioptric rings projecting from the rear base surface. The elements are contiguous and arranged in successive annular bands, the successive elements of the bands being arranged radially of the lens. The rings are concentric and there are a plurality of rings opposite each band of elements, the reflective surface of each ring being disposed at a different selected angle for distributing the light from each band across the conical lens beam.

---

This invention relates to lenses and more particularly to warning or signalling lenses.

The principal object of the invention is to provide a warning or signalling lens which projects a highly luminous beam from a comparatively low intensity light source, the beam being of conical configuration about the lens axis and of substantially uniform intensity across the beam.

Another important object is to provide a lens for converting a beam of large spherical angle into a comparatively narrow beam which, at any given distance, has a light intensity near the side of the beam closely approaching that at the center of the beam.

A further object is to provide a warning lens having lenticular elements of spherical surface-configuration at the front of the lens and catadioptric rings at the rear of the lens, the latter being so arranged as to direct light rays through the lens body to the lenticular elements to form apparent glowing spots on each element when viewed from any point within a predetermined area in front of the lens.

Other objects and advantages will be apparent from the following description in conjunction with the accompanying drawing in which:

FIGURE 3 is a greatly enlarged sectional view, similar to FIGURE 2, showing two adjacent lenticular elements and their associated catadioptric rings;

FIGURE 4 is a diagrammatic plan view of a conical beam cast by the lens;

FIGURE 5 is a diagrammatic perspective view of a lens and a testing area at a selected distance therefrom;

FIGURE 6 is an enlarged sectional view similar to FIGURE 3, showing the dispersion of light rays along a single catadioptric reflecting surface;

Figure 1:
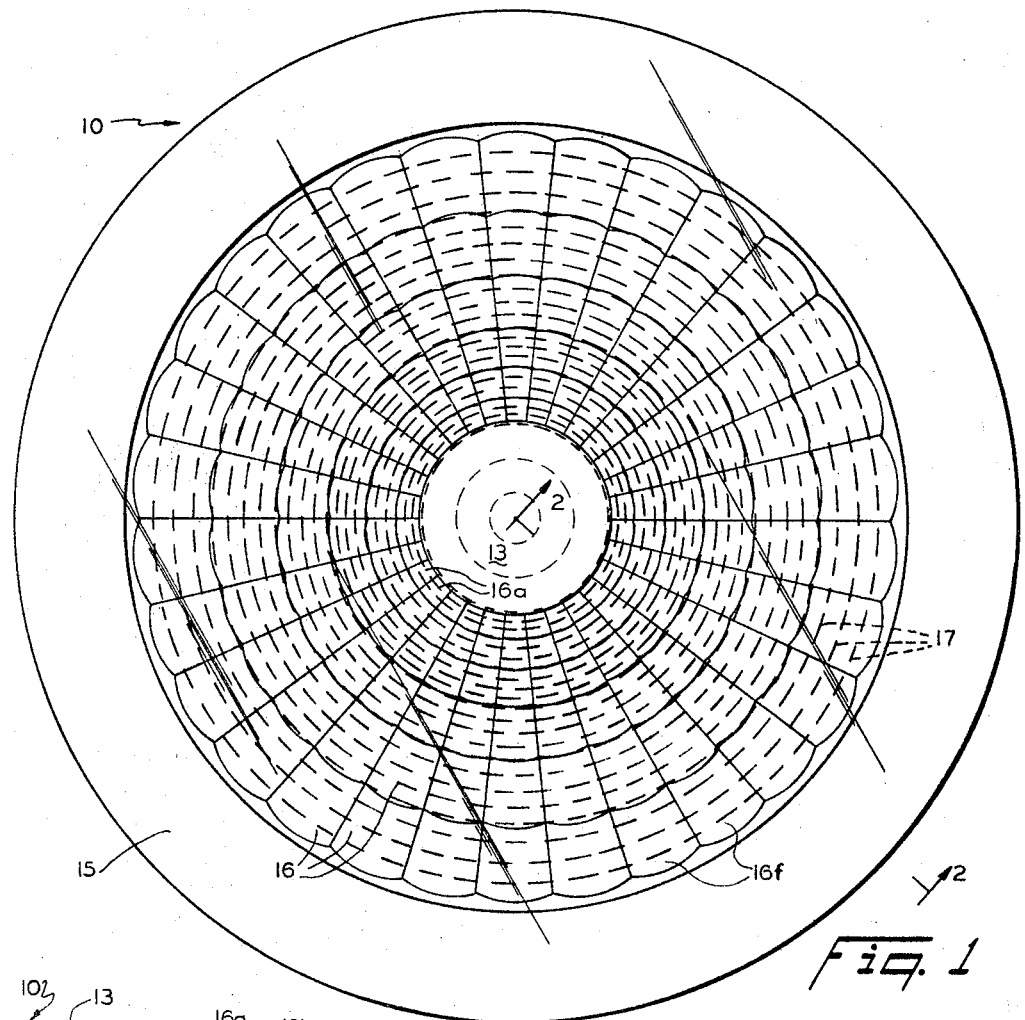
FIGURE 1 is a front elevational view of a lens according to the invention.
Figure 2:
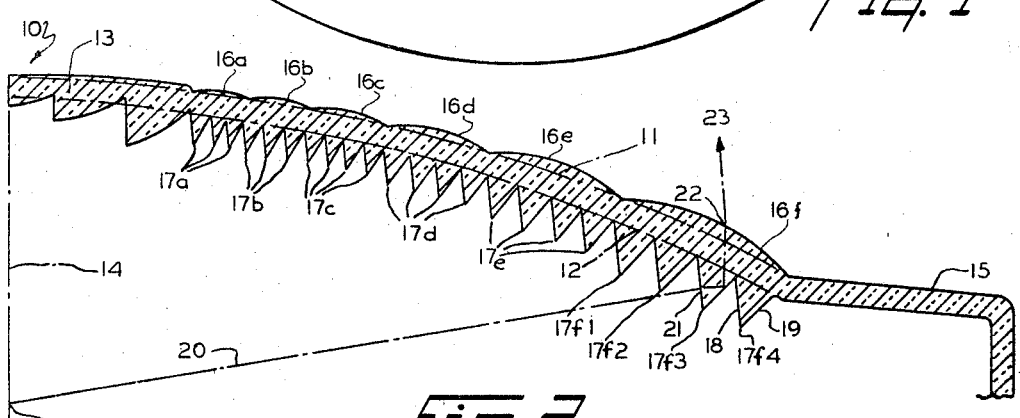
FIGURE 2 is sectional view on the line 2—2 of FIGURE 1.

Referring more particularly to FIGURES 1 and 2, lens 10 in circular and has parallel curve front and rear base surfaces 11 and 12, arcuate in cross section. The central portion 13 of the lens is of the fresnel type for focusing and distributing light from a light source, centered at S on the lens axis 14, divergently to the area in front of the lens. The outer annular flange or rim portion 15 is provided with reflex reflector means, not shown, as is usual in warning lenses.

Between the central portion 13 and rim 15 the front base surface 11 is provided with projecting light-emitting spherically-surfaced lenticular elements 16. The elements 16 are arranged in successive circular rows or annular bands of elements 16a, 16b, 16c, 16d, 16e and 16f, respectively. The surfaces of the elements are of successively larger spherical radius from the row 16a adjacent the lens center portion to the row 16f adjacent the reflective rim 15. The separate elements 16 of the circular rows of elements 16 are divided along equiangularly spaced radii or lines from the lens center, as shown, to form an arrangement in a radial and circular grid pattern.

To those skilled in the art, it will be apparent that the straight sides and the curved ends of the surfaces of lenticular elements 16 result from the intersection of spherical recesses formed in the mold cavity, the centers of the recesses being disposed along radial lines and the recesses of larger spherical radii being of greater depth.

A plurality of catadioptric rings or annular teeth 17 are formed on the rear base surface 12 of the lens 10, by the usual method of providing the male portion of the mold with tubular elements having angularly related annular end surfaces as described in Patent 2,831,394 to Heenan et al., dated April 22, 1958.

The catadioptric rings 17 are grouped opposite the circular rows or annular bands of lenticular elements 16, rings 17a being opposite elements 16a, rings 17b being opposite elements 16b, etc. It will be understood that each ring 17 has a light receiving and refracting surface 18 and a total light reflecting surface 19, as indicated with respect to the ring 17f4 in FIGURE 2, for reflecting a ray of light from the source toward the lenticular element 16 opposite the respective ring. For example, a ray 20 from the source at S strikes the refracting surface 18 of the ring 17f3 at 21 and is refracted toward the reflecting surface 19 of the ring and is then reflected toward the lenticular element 16f opposite the ring, as indicated in broken lines in FIGURE 2. At the surface of the element 16f, the ray is again refracted at 22, and, as it emerges from the front surface of the lens, is thereby given a direction as indicated by the arrow at 23.

Referring now to FIGURE 3, the rings 17b1, 17b2 and 17b3 are shown, greatly enlarged, opposite a lenticular element 16b and rings 17c1, 17c2, 17c3 and 17c4 are shown opposite an element 16c. Rays 20, in the plane of the paper, are shown in broken lines coming from a source at S, not shown, striking the refracting surfaces 18 of the respective rings 17, being reflected by the surfaces 19 of the rings, being again refracted upon emerging from the front surface of the lenticular elements 16 and thereby given directions indicated by the arrows 23a, 23b, 23c, 23d, 23e, 23f, and 23g.

Each of the surfaces 18 is disposed at the same small angle to the axis of lens 10 for convenience in calculating the optics of the lens. The reflecting surfaces 19 of the rings, however, are given different, carefully calculated angles with respect to the lens axis for controlling the direction of the light emerging from the front surface of the lens. The rings 17 are selectively disposed in groups opposite the bands of lenticular elements 16 so that light rays received by the refracting surfaces 18 of the rings are reflected by the reflecting surfaces 19 toward an element 16 of the opposite band for emergence therefrom.

The reflecting surface of each ring in each group is given a different angle so as to disperse the emerging light over a carefully calculated angular area in front of the lens. Light received by rings 17b1, 17b2, and 17b3, for example, emerges along the arrows 23a, 23b and 23c, and light received by rings 17c1–17c4, inclusive, emerges in the directions indicated at 23d–23g, inclusive. The light along 23d and 23g, for example, converges at some point in front of the lens and crosses, forming a diverging beam of light having a definite angular spread and direction according to the selected angles at which the reflecting surfaces 19 are disposed, and also according to the radius of curvature of the surfaces of elements 16 and the index of refraction of the material used in molding the lens.

While the rays 20, indicated in FIGURES 2 and 3, are all in the plane of the paper, the rings 17 are annular and the lenticular elements 16 are disposed in cooperating circular rows and all the elements in each row have the same angular relation to the lens axis and hence the same relation with the reflecting surfaces of the rings opposite each element. By a careful selection of the angular disposition of the reflecting surfaces of the rings that cooperate with each circular row of elements, therefore, the distribution of light as it emerges from all of the elements of the row can be controlled throughout the cone of light that is emitted by that row of elements.

Referring now to FIGURES 4 and 5, a lens 10 may be said to have a conical beam 24, since the distribution of light from the whole lens is the same about the axis 14 of the lens. If a screen is placed at a given distance D, a circular portion T of the screen will be illuminated, as indicated in FIGURE 5. The lens 10 described above, for example, has a conical beam having a vertex angle of substantially twenty degrees, or a half angle of ten degrees on all sides of the lens axis 14.

Since warning lenses are used in highway barrier lamps, some state highway safety laws require that a rectangular portion of the screen, as indicated at L in FIGURE 5, be illuminated throughout with light of a certain minimum intensity, measured in candle power. The intensity of illumination at the center of the rectangle may be easily increased but the problem of increasing the candle power of the illumination at the corners, without appreciable sacrifice of illumination intensity at the center, is more difficult because of the overlap of the conical beam at the sides, top and bottom of the rectangle as shown in FIGURE 5. However, the overlapping of the rectangular area by the circular resultant of the conical beam on the test screen provides a much wider tolerance in positioning a highway barrier lamp than would be the case if the beam had a rectangular pattern on the screen.

Referring now to FIGURE 6, light rays from the center of the source at S, not shown, are received, and reflected by the entire reflecting surface 19 of any given ring, for example, ring 17e1, from the inner to the outer edge thereof. Reflected and refracted rays at substantially opposite edges of the ring reflecting surface are illustrated emerging from the front of the lens in the direction of the arrows 23h and 23i. These emitted rays converge, cross at some point in front of the lens and then diverge at the same angle in a conical or quasi-conical beam to illustrate the divergence of the various rays along each reflecting surface. It will be understood that this divergence occurs in connection with the emitted light illustrated by each of the arrows 23a–23g, inclusive, shown in FIGURE 3.

Referring again to FIGURE 3, and considering only the catadioptric rings 17b1, 17b2 and 17b3 and lenticular element 16b, the particular angular relationship of the reflecting surface 19 of ring 17b1 with the lens axis 14 is computed to direct the emerging light, which diverges in a beam as described in connection with FIGURE 6, in the general direction illustrated by arrows 23a, at one zone of the target T. The angular disposition of the surface 19 of ring 17b2 is computed to direct the emerging light illustrated by arrow 23b at another zone, and the surface 19 of ring 17b3 is computed to direct the emerging light along arrow 23c at still another zone.

Since the rings 17b1, 17b2 and 17b3 are opposite a cooperating group or circular row of elements 16b, it is not necessary, in considering light intensity, to consider the actual zone on which the light along arrow 23a from any particular element is directed, but only the radial extent of this zone, since similar and overlapping zones are illuminated by other elements 16b in the circular row. The circular row of elements 16b and the cooperating rings 17b1, 17b2 and 17b3 may, therefore, be regarded as a complete lens system in the computation of the angular disposition of the surfaces 19 and the light reflected from each reflecting surface 19 may, in this sense, be regarded as collimated light.

Figure 7:
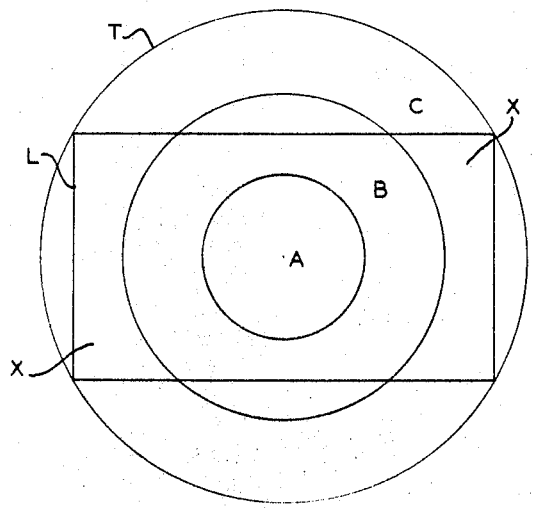
FIGURE 7 is a diagrammatic elevational view of the testing area of FIGURE 5.

Referring to FIGURE 7, a circular target area T is shown divided into a circular central area A, and successive annular areas B and C. Light emitted in the direction of the arrow 23b of FIGURE 3 falls mainly on the zone A, light along the arrow 23a on zone B and light along arrow 23c on zone C. There is an overlapping of zones, of course, but the diagram shown in FIGURE 7 is illustrative of the effect actually achieved by the optics system comprised by the 16b element circular row, as demonstrated by candlepower measurement tests.

With respect to the rectangular area L, which is the area actually tested for state approval, it will be seen that an increase of light intensity in the area C may be made by a slight angular adjustment of the reflecting surfaces 19 of rings 17b1 and 17b3 without substantial reduction in the light intensity in area A. Alternatively, a slight angular adjustment of the surface 19 of ring 17b3 may be made to increase the effective light intensity in area C, without substantially affecting the measured intensity in areas A and B. Any change in light intensity in area C is the same for that portion X of the rectangular test area L which lies in area C. Lens 10 is therefore tailored to be acceptable in states having high requirements for illumination intensity. Moreover, as the requirements are changed, light intensity distribution can easily be changed by a simple alteration of the dies in which lenses are molded.

The importance of this flexibility, the ease with which the light intensity distribution may be varied by an adjustment in angular disposition of the reflecting surface of one or more of the catadioptric rings, will be apparent to those skilled in the art. The tubular elements in the male portion of the die, which control the contours of the rings 17, may be simply and inexpensively removed from the die and refinished to change the angular disposition of any of the reflecting surfaces 19 of lenses thereafter molded in the die, should actual tests reveal the necessity therefor.

Furthermore, aside from corrections which are necessary because of miscalculations in computing the theoretical optics of the lens or in imperfect execution in the manufacture of the die, warning lenses are usually molded in plastic material which may warp, after removal from the die, in unexpected ways due to the conformation of the lens. Correction for the imperfect light distribution caused by any warpage, which is constant for all lenses produced by the die, may also be made in the same manner.

It should be noted, also, that the disposition of the lenticular elements over the front surface of the lens results in a surface which is comparatively regular in outline. There are no deep irregularities or sharp crevices in the front surface in which dirt may accumulate and this outer surface is easily kept clean.

In warning lenses, another consideration is important. Light intensity distribution at any given distance is one aspect of the problem, but equally important is the "warning power" or appearance of brightness on the lighted lens to a viewer in front of the lens. As is well known in the art, a plurality of spots of light apparently on the front face of the lens, or in front of the lens, appears to the observer as a uniformly illuminated surface due to the limited resolving power of the human eye.

It has been found that the circular and radial grid arrangement of the lenticular elements 16, each row of which cooperates with a group of catadioptric rings 17, results in the lighted lens having brilliantly illuminated spots apparent to a viewer substantially anywhere within the conical illuminated area 24 shown in FIGURE 4. Moreover, the illuminated spots appear in each of the lenticular elements 16, resulting in an apparent illumination of substantially the whole lens front surface.

Figures 9, 10:
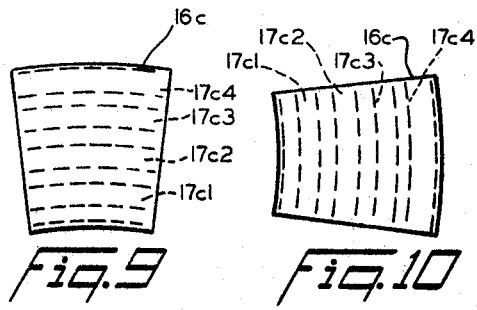
FIGURES 9 and 10 are enlarged elevational views of single lenticular elements at the top and one side, respectively, of FIGURE 1.
Figure 8:
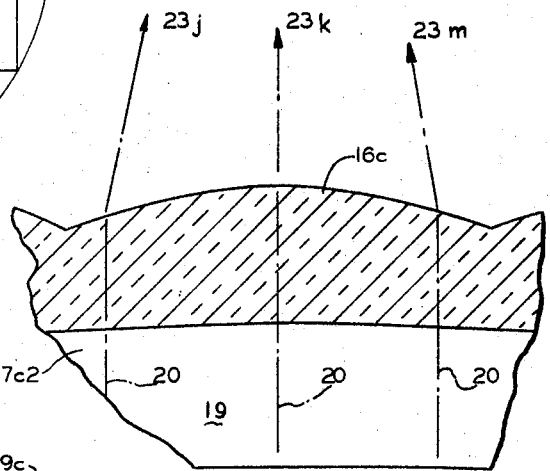
FIGURE 8 is a sectional view on the line 8—8 of FIGURE 3.

Referring to FIGURES 3 and 8, a lenticular element 16c, disposed to the viewer as shown in FIGURE 9, has rays 20 reflected from the reflecting surface 19 of catadioptric ring 17c2, for example, and emerging along the arrows 23j, 23k, and 23m. The emerging rays converge and cross at same point in front of the lens and diverge again at the same angles. It will therefore be apparent that a viewer in front of the lens will see a bright spot on the surface of this particular element 16c at some point depending on his position to the left or right of the lens axis. Since there are four catadioptric rings 17 cooperating with this particular element, the bright spot may appear vertically across one or more rings depending on the position of the viewer above or below the lens axis.

Similarly, with respect to an element 16c disposed as shown in FIGURE 10, a viewer in front of the lens will see a bright spot across one or more of the rings 17 according to his position to the right or left of the lens axis. The spot will also extend along the ring or rings for a greater or less distance according to the viewer's position above or below the lens axis.

Accordingly, the entire lenticulated front surface of the lens appears to be lit up when viewed from substantially any angle within the illuminated cone 24 shown in FIGURE 4. Furthermore, since the front surface is broken up into six circular rows of lenticular elements and each row is divided into thirty segmental elements of twelve degree width, the effect of a continuous glowing surface is obtained. The dispersal of light from each lenticular element is sufficient to eliminate the so-called spoke-effect and, since the outline of lenticular elements conforms to and follows the outline of the catadioptric rings, there is no "on-and-off" effect, that is, appearance of the brilliant spot of light going off at one element and suddenly appearing at the adjacent element when the viewer moves from one side to the other of the illuminated area.

When the lens 10 is constantly illuminated with a low-intensity light source approximately at the point S, as shown in FIGURE 2, a rectangular test zone at a distance of 45 feet from the lens is illuminated ten degrees on either side of the lens axis and 5 degrees above and below the lens axis. Because the light from each circular row of lenticular elements is distributed across the conical beam of light from the lens and concentrated within the beam, it is possible to obtain illumination of an intensity, measured by photoelectric instruments, higher, on the average, at any given point in the test zone than heretofore possible with other warning lenses. By actual tests, readings at the four corners of the rectangular test zone, the hardest area to illuminate adequately, show a candle power intensity of 60% when compared to the peak candle power intensity of the center zone. As described above, the visual brightness, or apparent glowing of the lens, also extends substantially over the whole surface of the lens when viewed from substantially any angle in this test zone.

Figure 11:
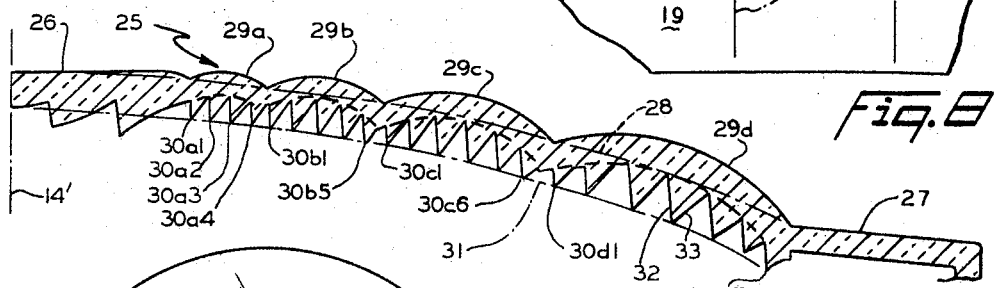
FIGURE 11 is an enlarged sectional view on the line 11—11 of FIGURE 12.
Figure 12:
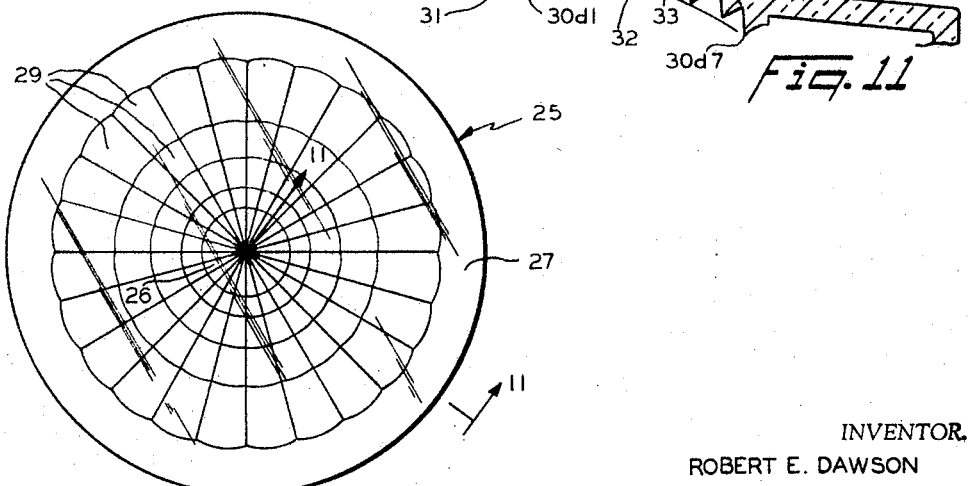
FIGURE 12 is front elevational view of a modified form of lens according to the invention.

Referring now to FIGURES 11 and 12, a modified form of lens 25 is shown. Lens 25 is also circular and has a fresnel lens portion 26 at the center and a reflex-reflecting rim 27 therearound. The front base surface 28 has a plurality of spherical-surfaced lenticular elements 29 arranged thereon in a circular and radial pattern.

There are four circular rows of elements 29a, 29b, 29c and 29d, each row divided into 24 individual elements, fifteen degrees in width, and the elements are centered in groups along radial lines. The spherical radius of each circular row of elements is successively larger as the distance from the lens center increases and the elements project outward from the front base surface 28 which is arcuate in cross-section.

The inner surface of the lens 25 is provided with a plurality of catadioptric rings 30, each circular row of lenticular elements having a plurality of rings opposite and cooperating therewith. Lens 25 differs from lens 10 particularly in that the rear or inner ends of the rings, the points of the "teeth," lie along the curved inner "base surface" 31, which parallel the outer base surface 28. The "roots" of the toothed rings, or spaces therebetween, therefore lie somewhat closer to the actual front surface of the lens along the radial lines forming the straight sides of each lenticular element than at the center of the elements shown in the sectional view of FIGURE 11. The wall thickness of the lens at all points in FIGURE 11 along the high points of the lenticular elements is substantially uniform and along any of the radial dividing lines is uniformly about half that along the centers as shown in section in FIGURE 11. The depth of the space between rings in certain cases is limited by spacing the teeth apart, as shown.

It will be noted that the circular row of elements 29a has four cooperating rings 30a opposite thereto, 29b has five rings, 29c has six, and 29d has seven. Each ring has a refracting surface 32 and a reflecting surface 33, as indicated in FIGURE 11, just as described in connection with the lens 10.

Rays of light from a light source are refracted and reflected as described above in connection with lens 10 and, by carefully computing the angular relation of the light reflecting surface 33 of each ring 30 to the lens axis 14', light is distributed over the entire zone of illumination of each circular row of elements 29.

Substantially uniform distribution of the light intensity over the target area is enhanced in lens 25 by the increase in number of rings cooperating with each row of lenticular elements and by the fact that the construction shown permits broader reflecting surfaces for many of the catadioptric rings. The "warning power" or apparent glowing of the entire lenticular surface of the lighted lens is enhanced also by the same characteristics.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A dished warning lens for directing light from a source on the lens axis in back of the lens in a conical beam about the lens axis in front of the lens of substantially equal intensity across the beam, comprising front and back base surfaces arcuate in cross section, a plurality of concentric catadioptric rings projecting from said back surface, each ring being V-shaped in cross-section and having a light refracting surface for receiving light from the source and a light reflecting surface for reflecting light from the refracting surface through the lens to the front surface thereof, and a plurality of cooperating contiguous light-emitting spherically-surfaced lenticular elements projecting from said front surface, the element centers being arranged circularly about the lens centers in successive circular rows, the centers of the elements in the successive rows being arranged radially of the lens along equiangularly spaced lines, a separate group of said catadioptric rings being arranged for reflecting light toward each of said rows, the rings having their reflective surfaces at different predetermined angles to the light source for distributing the emitted light from the lens evenly across the beam.

2. A warning lens for collecting light from a source axially back of the lens and projecting it forward in a conical beam, having coaxial front and back base surfaces arcuate in cross-section, a plurality of successive concentric catadioptric rings projecting from the rear base surface, each ring being V-shaped in cross-section and having a light refracting surface for receiving light from the source and a total light reflecting surface positioned to receive and reflect the rays of refracted light through the lens toward the front surface, and a plurality of contiguous lenticular elements projecting from the front base surface, the elements being arranged in successive concentric annular bands about the lens center, each element having a spherical light emitting surface substantially axially normal to the base surface, the centers of the elements in each band being equiangularly spaced around the lens center, the light emitting surfaces of all the elements in each band having the same radius of curvature, a different group of said catadioptric rings being arranged opposite each band of lenticular elements for directing light toward the elements of said band, the catadioptric rings having their reflecting surfaces at different predetermined angles to the lens axis for distributing light from each band of lenticular elements over a predetermined angular area of the beam in front of the lens.

3. A warning lens for directing light from a source axially back of the lens in a forward conical beam about the lens axis and having front and rear base surfaces substantially arcuate in cross section, a plurality of contiguous lenticular elements projecting from the front base surface and arranged in successive concentric circular bands about the lens center and in equiangular radial rows, each element having a light emitting spherical surface substantially axially normal to the front base surface, the elements in each circular band having the same radius of surface curvature and the successively outer elements in each radial row having successively larger radii of surface curvature, and a plurality of concentric and contiguous catadioptric rings projecting from the rear base surface opposite each circular band of elements, each ring being V-shaped in cross section and having a refracting surface for receiving light from the source and a total light reflecting surface positioned to receive the rays of light refracted from the refracting surface and reflect them through the lens toward the opposite circular band of elements, each ring having its reflecting surface disposed at a preselected angle to the lens axis, said angle being determined with respect to the direction of the rays of refracted light and the disposition of the curved surfaces of the elements in the circular band opposite the ring so as to distribute the emitted light from each circular band of elements over the whole conical beam of light emitted from the lens and to direct light from some of the rings to a predetermined angular area of the conical beam to increase the intensity of illumination at the outer portions of the beam.

4. The warning lens defined in claim 3 having a uniform wall thickness between the front base surface and the front extremities of the catadioptric rings.

5. The warning lens defined in claim 3 having the front extremities of the catadioptric rings lying along arcs substantially parallel to the front surfaces of the lenticular elements, and having the rear extremities of the rings lying substantially along the lens rear base surface.

6. The warning lens defined in claim 3 in which the reflecting surfaces of the catadioptric rings are each so disposed with respect to the opposite circular band of lenticular elements as to distribute the light emitted from each circular band of elements over a conical area in front of the lens having a vertex angle of substantially twenty degrees.

References Cited

UNITED STATES PATENTS

| | | | |
|---|---|---|---|
| 1,585,578 | 5/1926 | Warner | 340—383 |
| 2,113,829 | 4/1938 | Condon | 340—383 |
| 2,798,147 | 7/1957 | Orsatti | 340—383 X |

JOHN W. CALDWELL, *Primary Examiner.*

H. PITTS, *Assistant Examiner.*

U.S. Cl. X.R.

350—106